Dec. 8, 1931.    L. D. KAY    1,835,950
HUB CONSTRUCTION FOR TRUCK WHEELS
Filed Dec. 1, 1930

Inventor
Lloyd D. Kay,
By Lyon & Lyon
Attorneys

Patented Dec. 8, 1931

1,835,950

UNITED STATES PATENT OFFICE

LLOYD D. KAY, OF LOS ANGELES, CALIFORNIA, ASSIGNOR TO KAY-BRUNNER STEEL PRODUCTS INC., A CORPORATION

HUB CONSTRUCTION FOR TRUCK WHEELS

Application filed December 1, 1930. Serial No. 499,186.

This invention relates to a hub construction for truck wheels and the invention is particularly applicable to truck wheels for carrying dual tires. The demands of the trade include various forms of hubs and felloes, and the various designs of automobile trucks necessitate different lateral positions of the middle plane of the outer portion of the wheel with respect to the middle plane or approximate middle plane of the hub of the wheel. If orders for wheels of this type are to be filled promptly it is necessary to carry in stock a great variety of wheels in order to meet the special requirements of the hub and the special requirements of the felloes on which the tire rims are mounted.

The general object of this invention is to provide a hub construction which will overcome these difficulties and to provide a wheel having a construction at its hub which will enable felloes of different specific designs to be readily attached to hubs of different specific designs and particularly to provide features of construction for the hub which will enable the middle plane of the outer portion of the wheel to have a predetermined relation with respect to the middle plane of the wheel hub.

A further object of the invention is to provide a construction of this kind in which although the wheel body is attached to the hub at the outer end of the hub a very rigid connection can be made between the hub and wheel body so that for all intents and purposes the finished wheel will have substantially the same rigidity and solidarity as though formed of one casting. The invention is particularly applicable to cast wheels and especially wheels of cast iron or cast steel.

Further objects of the invention will appear hereinafter.

The invention consists of the novel parts and combination of parts to be described hereinafter, all of which contribute to produce an efficient hub construction for truck wheels.

A preferred embodiment of the invention is described in the following specification, while the broad scope of the invention is pointed out in the appended claims.

Figure 1:
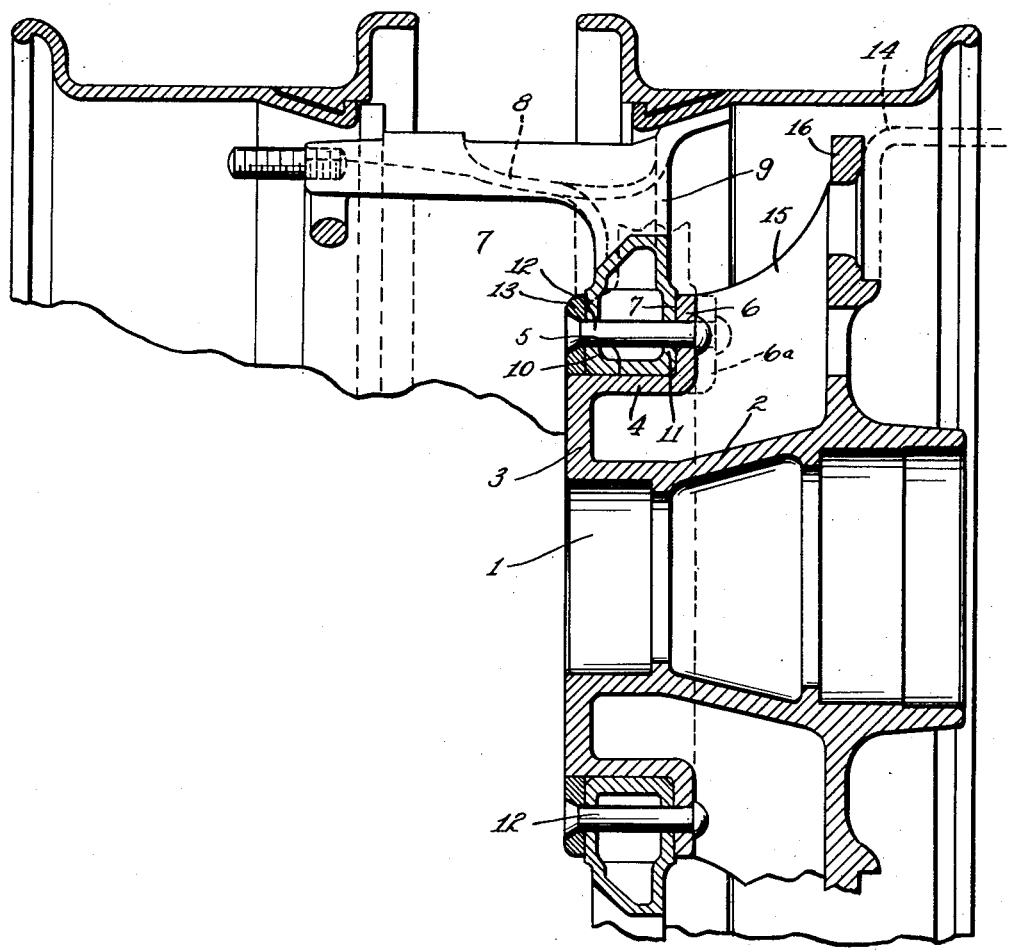
Figure 1 is a vertical section taken through a wheel having a hub construction embodying my invention, certain parts being broken away.

Before proceeding to a detailed description of the embodiment of the invention illustrated, it should be stated that a great variety of design exists in trucks that are in use with respect to the ends of the axles and their connection to the hubs of the wheels. There are also special requirements as to the location of the tire rim seats on the felloes of the wheels, and a certain amount of flexibility is desirable as regards the location of the middle plane of the outer portion of the wheel with respect to the location of the wheel hub. For example, where larger tires are to be carried on the wheel, it is necessary to provide for a shifting of the middle plane of the outer portion of the wheel in an outboard direction with respect to the hub of the wheel.

On the other hand, where a wheel design must be modified to adapt the wheel to carry smaller tires, it is desirable to produce a wheel design in which the middle plane of the outer portion of the wheel is shifted relatively in an outboard direction with respect to the location of the wheel hub.

A special specification may also be called for requiring certain specific features of the design of the outer portion of the wheel together with specific features of construction of the hub. It is not feasible to carry in stock wheels meeting all these special requirements so that they can be supplied on demand. Heretofore, wheels have been constructed with a hub portion formed as of one piece attached to a wheel body formed as one piece, but heretofore, to the best of my knowledge no attempt has been made to provide a correlated construction for the wheel body and hub which will particularly facilitate the production of wheels in which the middle planes of the felloe and the middle planes of the hub can readily be shifted toward or from each other to meet special requirements such as outlined above.

Referring more particularly to the parts, 1 represents a wheel hub adapted to be formed as a casting and comprising a sleeve 2 bored and counterbored on its interior to receive the end of the axle or the steering arm in case the wheel is to be mounted on a steering knuckle. The outboard end of this hub is provided with an end wall 3 that extends in a plane at right angles to the axis of the hub, and this wall is formed integral with the sleeve 2. The hub is further provided with an annular wall 4 that is integral with the end wall 3, and this wall is formed with a true outer face 5 which is finished to a certain dimension and is preferably of cylindrical form.

At the inboard end of the annular wall 4 which forms an outer sleeve for the hub, I provide a seat wall 6 which has a seat face 7 on its outboard side which is in a plane at right angles to the axis of the wheel.

The use of a cylindrical face 5 is particularly desirable as compared with a conical face which apparently might be used at this point, for the reason that it facilitates modification of the pattern used to make the hub casting. That is to say, it is easy to modify the pattern so as to effect a relative shifting of the outer portion of the wheel in or out by forming the part of the pattern that corresponds to the seat wall 6, as a separate piece. In casting the wheel to produce a certain alignment for this end wall, this can readily be done by having the lose piece on the pattern moved in or out on the hub portion of the pattern that corresponds to the outer sleeve 4 of the hub. In this way, the end wall 6 can be located in a shifted position such as indicated by the dotted lines 6a in Figure 1 in which the seat wall 6 is located further inboard on the wheel. In Figure 2 such a shifted position of this seat wall is indicated. In Figure 2, 6b indicates this seat wall in a position which will effect considerable shifting of the outboard portion or body of the wheel in an inboard direction.

Figure 2:
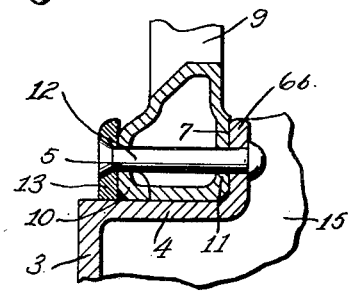
Figure 2 is a vertical section showing a portion of the hub construction and particularly illustrating how the invention adapts itself to the production of wheels in which the middle plane of the outer portion of the wheel can be shifted in the inboard direction. This feature is also indicated by the use of dotted lines in Figure 1.

In Figure 1, 7 indicates the body of the wheel which includes a felloe indicated by the dotted lines at 8 and having a plurality of radial spokes 9 that are cast integral with the felloe and with the nave 10 of the wheel. This nave is preferably of open "box-form" type, having a central bore of the same diameter as the outside diameter of the annular wall 4 so that when the body of the wheel is set in place this wall 4 will center the wheel. The inboard web 11 of the "box" of the nave seats against the seat face 7 of the seat wall 6. After the wheel body is placed on the hub as indicated, it is secured in place by a plurality of fastening devices preferably in the form of rivets 12 that pass through the nave and through the seat wall 6. These rivets are preferably riveted up on their outer ends which pass through a follower ring 13. While rivets may be used for this purpose, through bolts may be employed if desired.

In order to increase the rigidity of the walls 4 and 6, I prefer to provide integral radial webs which connect them to the sleeve 2. In the wheel illustrated which carries a brake drum indicated by the dotted lines 14, I provide a plurality of radial webs 15 that flare outwardly toward the inboard end of the sleeve at which point they connect integrally with a brake flange 16 that extends outwardly from the inboard end of the sleeve 2 in a plane at right angles to the axis of the wheel. In any wheel that carries a brake, it is necessary to provide such a flange to support the brake drum.

What I claim is:

1. In a hub construction for truck wheels, a hub member having an integral sleeve adjacent the axis of the wheel with an end wall extending outwardly from the outboard end of the sleeve, and having an annular centering wall integral with said end wall for centering the body portion of the wheel, said wheel further having a seat wall integral with said annular wall and extending outwardly from the axis of the wheel, a wheel body having a nave with an opening therethrough fitting over said annular wall and having an inboard face seating against said seat wall, and fastening devices passing through said nave and into said seat wall for securing the body of the wheel to the hub member, said sleeve having an integral flange extending therefrom near its inboard end in a plane substantially at right angles to the axis of the wheel with integral webs connecting the same with said seat wall.

2. In a hub construction for truck wheels, a hub member having an integral sleeve adjacent the axis of the wheel and having an end wall extending outwardly from the outboard end of the sleeve and having an annular centering wall integral with said end wall for centering the body portion of the wheel, said wheel further having a seat wall integral with said annular wall and extending outwardly from the axis of the wheel, a wheel body having a nave with an opening therethrough fitting over said annular wall and having an inboard face seating against said seat wall, and fastening devices passing through said nave and into said seat wall for securing the body of the wheel to the hub member, the inboard end of said sleeve having an integral flange extending in a plane substantially at right angles to the axis of the wheel and having integral substantially radial webs connecting the same with said seat wall, said first named end wall and said centering wall.

Signed at Alhambra, California, this 24th day of November, 1930.

LLOYD D. KAY.